United States Patent [19]

Ellis et al.

[11] Patent Number: 5,373,535
[45] Date of Patent: Dec. 13, 1994

[54] METHOD AND APPARATUS FOR DIGITALLY COMPENSATING DIGITAL CLOCK SKEW FOR HIGH SPEED DIGITAL CIRCUITS

[75] Inventors: David Ellis, Hillsboro; Gary Brady, Aloha, both of Oreg.

[73] Assignee: Intel Corporation, Santa Clara, Calif.

[21] Appl. No.: 40,424

[22] Filed: Mar. 31, 1993

[51] Int. Cl.$^5$ .............................................. H04L 7/00
[52] U.S. Cl. ................................... 375/106; 375/118; 371/1; 327/292
[58] Field of Search ............... 375/4, 106, 118; 371/1; 307/265, 268, 269; 328/58

[56] References Cited

U.S. PATENT DOCUMENTS

| | | | |
|---|---|---|---|
| 4,527,075 | 7/1985 | Zbinden | 307/265 |
| 4,891,825 | 1/1990 | Hansen | 328/58 |
| 5,008,563 | 4/1991 | Kenney et al. | 307/265 |
| 5,258,660 | 11/1993 | Nelson et al. | 307/269 |

*Primary Examiner*—Stephen Chin
*Assistant Examiner*—Don Vo
*Attorney, Agent, or Firm*—Blakely, Sokoloff, Taylor & Zafman

[57] ABSTRACT

A digital clock reconstruction circuit comprising a first flip flop, a programmable delay chain, and a first assembly of gates is provided to digitally compensate an entering digital clock's skew for a high speed digital circuit by digitally reconstructing the entering clock. The reconstructed clock will also provide the minimum amount of high and low time in a period required by the components of the high speed circuit. Additionally, at least one measurement or comparison circuit is provided for measuring the frequencies of the reconstructed clock under various delay settings of the programmable delay chain to calibrate the digital clock reconstruction circuit. Under the calibration process of the present invention, the delay setting is determined iteratively, starting from an initial setting and varying the delay setting in a predetermined manner. In the preferred embodiment, a ring oscillator is also provided to guide the selection of the starting delay setting, and multiple measurement and comparison circuits are provided. The measurement and comparison circuits are used to collect various measurements to monitor the digital clock reconstruction circuit during normal operation as well as calibrating the circuit. Furthermore, the digital clock reconstruction circuit is provided with an additional flip flop and gate assembly to generate an additional reconstructed clock. The additional reconstructed clock is periodically monitored during normal operation to provide early warning to the fact that the reconstructed clock period is drifting from 50% duty cycle symmetry.

54 Claims, 14 Drawing Sheets

METHOD AND APPARATUS FOR DIGITALLY COMPENSATING DIGITAL CLOCK SKEW FOR HIGH SPEED DIGITAL CIRCUITS

BACKGROUND OF THE INVENTION

1. Field of the Invention

The present invention relates to the field of high speed digital circuits, in particular, high speed digital circuits based on CMOS technology. More specifically, the present invention relates to a method and apparatus for digitally compensating digital clock skew for high speed digital circuits in a digital system, such as a data instrumentation system.

2. Background

In a digital system having a number of digital circuits, such as a data instrumentation system, as the digital clock passes through one of the digital circuits, the clock high time tends to either shrink or expand, resulting in the skewing of the digital clock. In some CMOS circuits, the skewing of the digital clock, i.e. variations in the clock high time and clock low time, can be more than two (2) or three (3) nanoseconds (ns) depending on the loading of the particular CMOS circuits. A 2-3 ns skew can be significant, depending on the length of the digital clock period. Experience has shown that 2-3 ns skew actually become limiting to either the speed of the system or the complexity of the logic as the digital clock period approaches the range of 10-15 ns. The digital clock period approaches the range of 10-15 ns, as the operating speed approaches about 66 MHZ. As a result, 66 MHZ has become the de facto maximum operating speed for many digital designs based on CMOS high speed circuits under the current 0.8 micron technology. Since it is obviously beneficial to be able to improve and push the maximum operating speed of digital designs based on CMOS high speed circuits beyond 66 MHZ, it is desirable to be able to digitally compensate the digital clock skew as it travels through one CMOS high speed circuit onto another.

Additionally, for a digital system such as a data instrumentation system, it is often operated at different speeds at different times. However, depending on the design and the load, the CMOS high speed circuits in the digital system require a certain minimum amount of high and low time in each clock period in order to function properly regardless of the operating frequency. Thus, it is further desirable to be able to ensure that the minimum amount of high and low time are provided when digitally compensating digital clock skew.

As will be disclosed, the present invention provides such a method and apparatus which advantageously achieves the desirable results described above. As will be obvious from the descriptions to follow, the present invention has particular application to high speed data instrumentation systems.

SUMMARY OF THE INVENTION

Under the present invention, the desirable results are advantageously achieved by digitally reconstructing the digital clock as it enters a high speed digital circuit after traveling through another high speed digital circuit. Each high speed digital circuit is provided with a digital clock reconstruction circuit for reconstructing the entering digital clock. The digital clock reconstruction circuit comprises a flip flop, a programmable delay chain, and an assembly of gates, coupled to each other in a circular manner. The flip flop generates the reconstructed digital clock using the entering clock and either a regular or a shortened clear signal provided by the assembly of gates. The reconstructed digital clock and its complement are provided to the programmable delay chain, which in turn uses them to generate input signals for the assembly of gates for the generation of the regular or shortened clear signal for the flip flop.

Additionally, each digital high speed circuit is provided with one or more measurement or comparison circuits for measuring the frequencies of various reconstructed clocks generated under different delay settings of the programmable delay chain or comparing these frequencies to the frequency of the entering clock, to determine the delay setting for the programmable delay chain for achieving frequency symmetry between the entering clock and the reconstructed clock, i.e. same number of clocks, and 50% duty cycle symmetry for the reconstructed clock period, i.e. an equal amount of high and low time, thereby calibrating the digital clock reconstruction circuit.

The digital clock reconstruction circuit is calibrated using the maximum operating frequency. The proper delay setting for the programmable delay chain is determined iteratively, starting with an initial delay setting and varying the delay setting systematically in a predetermined manner. As a result, when frequency symmetry is achieved between the reconstructed and the entering clocks, 50% duty cycle symmetry for the reconstructed clock period is also simultaneously achieved.

Preferably, the digital high speed circuit is also provided with a ring oscillator comprising a number of rings, each having a known number of delay elements used in the programmable delay chain, for generating different ring signals. The frequencies of the ring signals, determined using one of the measurement circuits, are used to infer the operational delay yield of a delay element in the programmable delay chain, thereby providing guidance for the selection of the calibration starting delay setting for the programmable delay chain.

Furthermore, it is preferred if at least one of the measurement circuits provided can actually measure the high and low time of a reconstructed clock period during calibration, and at least one of the measurement or comparison circuits provided is used to periodically monitor and determine whether the reconstructed and entering clocks remain symmetrical to each other in frequency during normal operation. In fact, it is further preferred that the digital clock reconstruction circuit comprises an additional assembly of flip flop and gate coupled to the programmable delay chain in a similar manner. The additional flip flop is used to generate an additional reconstructed clock using the entering clock and an additional regular clear signal provided by the additional gate assembly. The additional reconstructed clock, generated using the additional regular clear signal, is periodically monitored for providing early warning to the fact that the reconstructed clock period is beginning to drift away from the 50% duty cycle symmetry.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
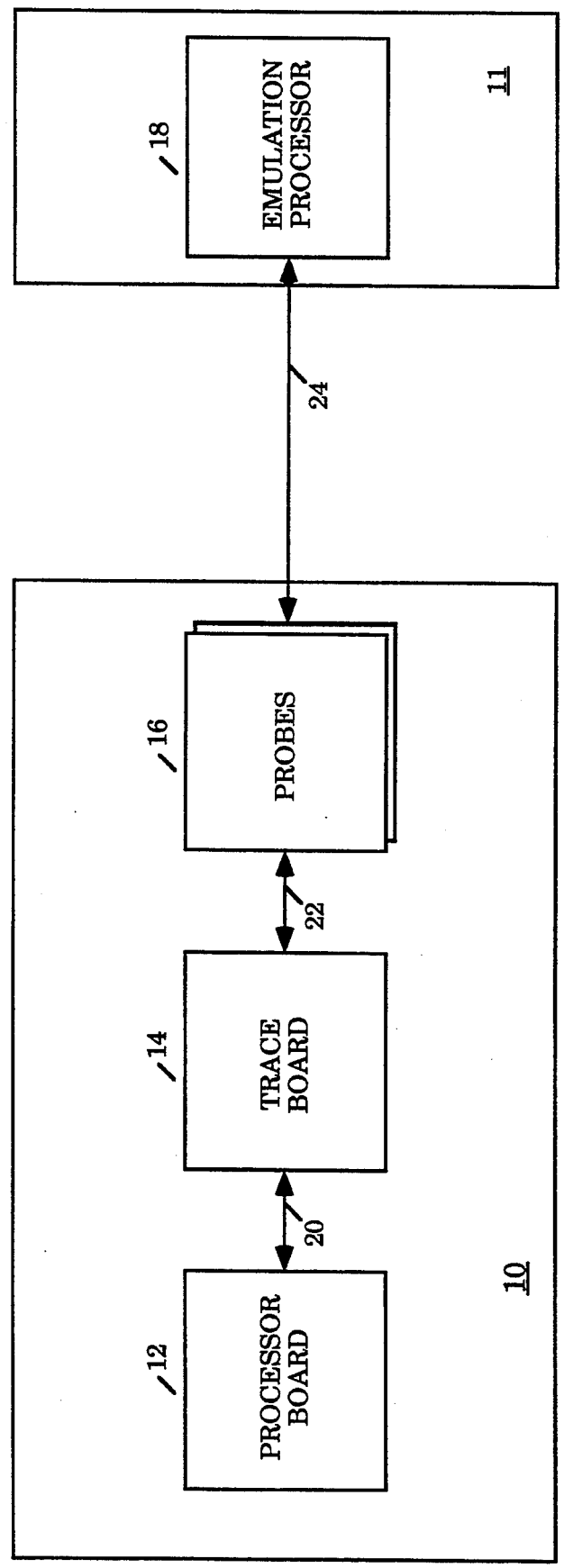
FIG. 1 illustrates an exemplary data instrumentation system incorporated with the teachings of the present invention.

Referring now to FIG. 1, a block diagram illustrating an exemplary data instrumentation system incorporated with the teachings of the present invention is shown. Shown is an exemplary data instrumentation system 10 incorporated with the teachings of the present invention coupled to a target system 11 for monitoring, acquiring data, and controlling the target system 11. Depending on the target system 11, the data instrumentation system 10 may be operated with different operating speeds at different times. The exemplary data instrumentation system 10 comprises a processor board 12, a trace board 14 incorporated with the teachings of the present invention, and a number of probes 16, while the target system 11 comprises an emulation processor. The processor board 12 is coupled to the trace board 14, for example, through a parallel bus 20. The trace board 14 is coupled to the probes 16, for example, through a number of parallel cables 22. The probes 16 are in turn coupled to the emulation processor 18. The trace board 14 will be described below in further detail with additional references to the remaining figures. The processor board 12, the probes 16 and the emulation processor 18 are intended to represent a broad category of these elements found in many data instrumentation and target systems. Their constitutions and functions are well known and will not be further described.

Figure 2:
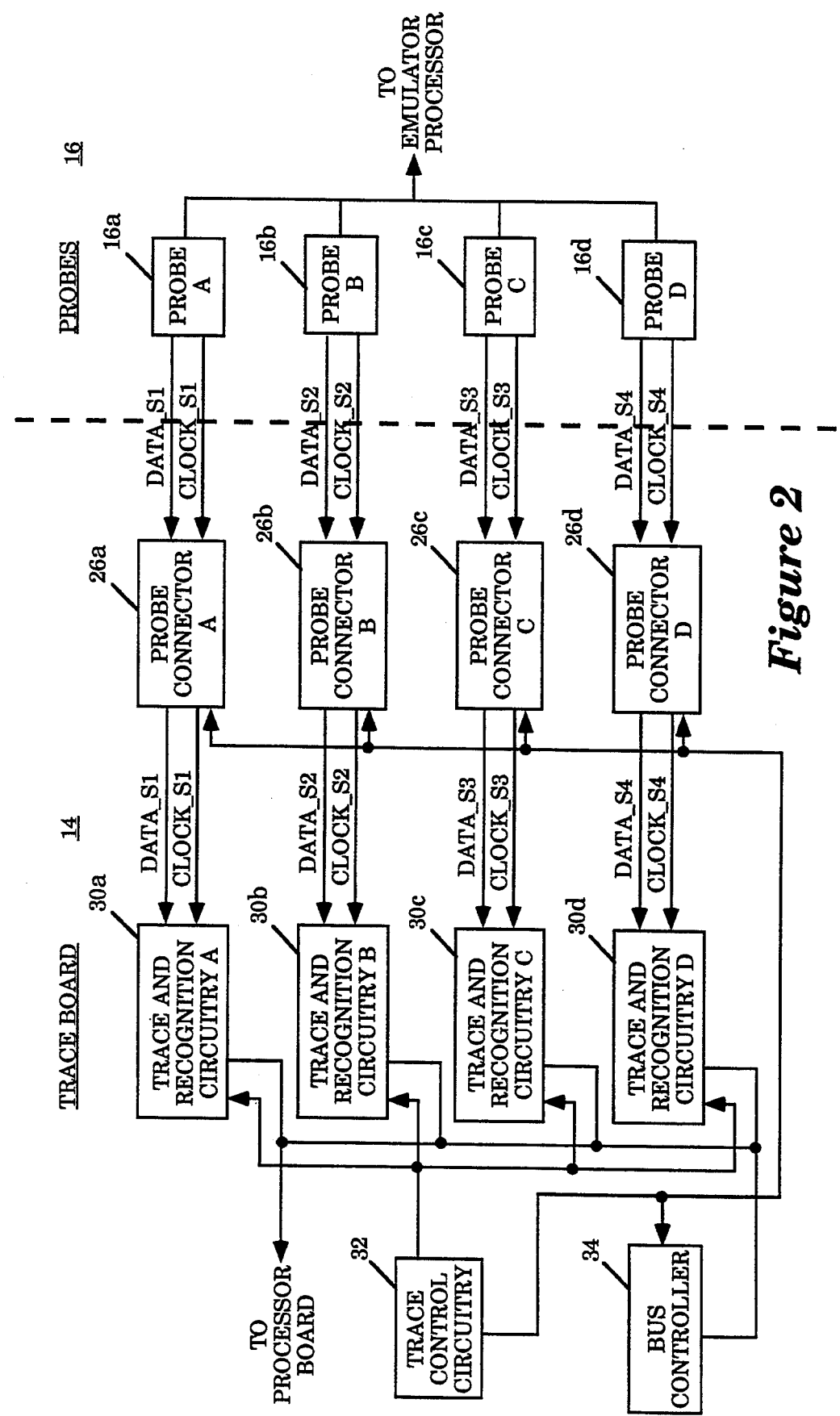
FIG. 2 illustrates the trace board of FIG. 1 in further detail.

Referring now to FIG. 2, a block diagram illustrating the trace board of FIG. 1 in further detail is shown. The trace board 14 comprises a plurality of high speed trace and recognition circuitry (TAR) 30a–30d incorporated with the teachings of the present invention, a number of probe connectors 26a–26d, a bus controller 34, and trace control circuitry 32. The probe connectors 26a–26d, the bus controller 34, and the trace control circuitry 32 are all coupled to the high speed TARs 30a–30d. The probe connectors 26a–26d are also coupled to the bus controller 34 and the trace control circuitry 32. Each of the high speed TARs 30a–30d receives probe data along with its own digital clock from a probe 16a–16d through its corresponding probe connector 26a–26d. The digital clocks are skewed as they travel from the probes 16a–16d to the TARs 30a–30d. While each of the high speed TARs 30a–30d may operate at different operating speeds for different target systems, its components do require a minimum amount of high and low time in each clock period of the digital clock it receives along with the probe data. Thus, each high speed TAR 30a–30d is provided with digital clock reconstruction and related circuitry of the present invention for compensating the entering clock's skew, and ensuring the required amount of high and low time is provided. The digital clock reconstruction and related circuitry provided to each of the high speed TARs 30a–30d will be described below in further detail with additional references to the remaining figures. Otherwise, the high speed TARs 30a–30d, the probe connectors 26a–26d, the bus controller 34, and the trace control circuitry 32 are intended to represent a broad category of these elements found in many trace boards, including but not limited the trace boards described in copending U.S. patent applications, Ser. No. 08/040,902, entitled Method and Apparatus For Deskewing/Resynchronizing Data Slices With Variable Skews, and Ser. No. 08/040,901, entitled Method and Apparatus For Synchronizing Periodic Sync Pulse Generations By A Number Of High Speed Circuits, both assigned to assignee of the present invention, which are hereby fully incorporated by reference. Their constitutions and functions will not be further described.

While the present invention is being described with high speed TARs of a trace board of a data instrumentation system, based on the description to follow, it will be appreciated that the present invention may be practiced with other high speed digital circuits on the data instrumentation system. In fact, the present invention may be practiced with other digital systems comprising high speed circuit, such as a high speed microprocessor based computer system.

Figure 3:
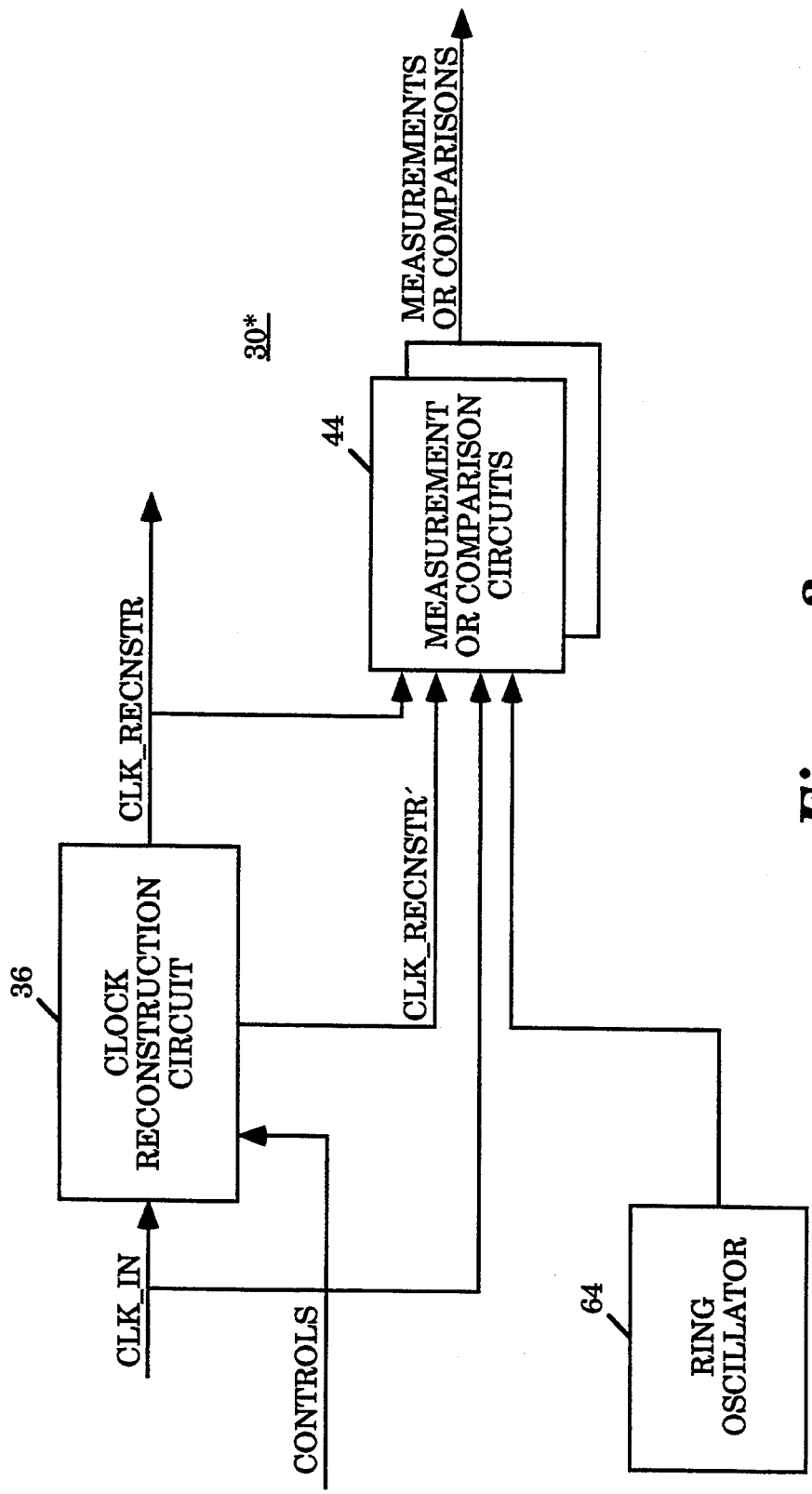
FIG. 3 illustrates the digital clock reconstruction and related circuitry of the present invention in each of the TARs of FIG. 2.

Referring now to FIG. 3, a block diagram illustrating the digital clock reconstruction and related circuitry of the present invention provided to each of the TARs of FIG. 2 is shown. As illustrated, each TAR is provided with a digital clock reconstruction circuit 36 and at a minimum, a measurement or a comparison circuit 44. Preferably, for improved reliability, multiple measurement or comparison circuits 44 are provided, and for improved useability, a ring oscillator 64 is also provided. The digital clock reconstruction circuit 36 is used to generate a first reconstructed clock (CLK_RECNSTR), and preferably a second reconstructed clock (CLK_RECNSTR') based on the entering clock (CLK_IN) and a number of implementation dependent control signals (CONTROLS) provided by the trace control circuitry 32. When calibrated, CLK_RECNSTR corrects the digital skew of CLK_IN and meets the minimum high and low time requirement of the TAR regardless of the ultimate operating speed.

CLK_RECNSTR' is used as a basis during normal operation for providing early warning to the fact that the clock period of CLK_RECNSTR is starting to drift away from 50% duty cycle symmetry. The measurement or comparison circuits 44 are used to selectively measure the frequencies of CLK_RECNSTR and CLK_RECNSTR' or compare them to the frequency of CLK_IN during calibration and normal operation of the digital clock reconstruction circuit 36. The ring oscillator 64 is used to generate a number of ring signals during calibration. The digital clock reconstruction circuit 36, the measurement and comparison circuits 44, the ring oscillator 64, the difference between CLK_RECNSTR and CLK_RECNSTR', the calibration process, and monitoring during normal operation, will be described in further detail below with references to the remaining figures.

Figure 4:
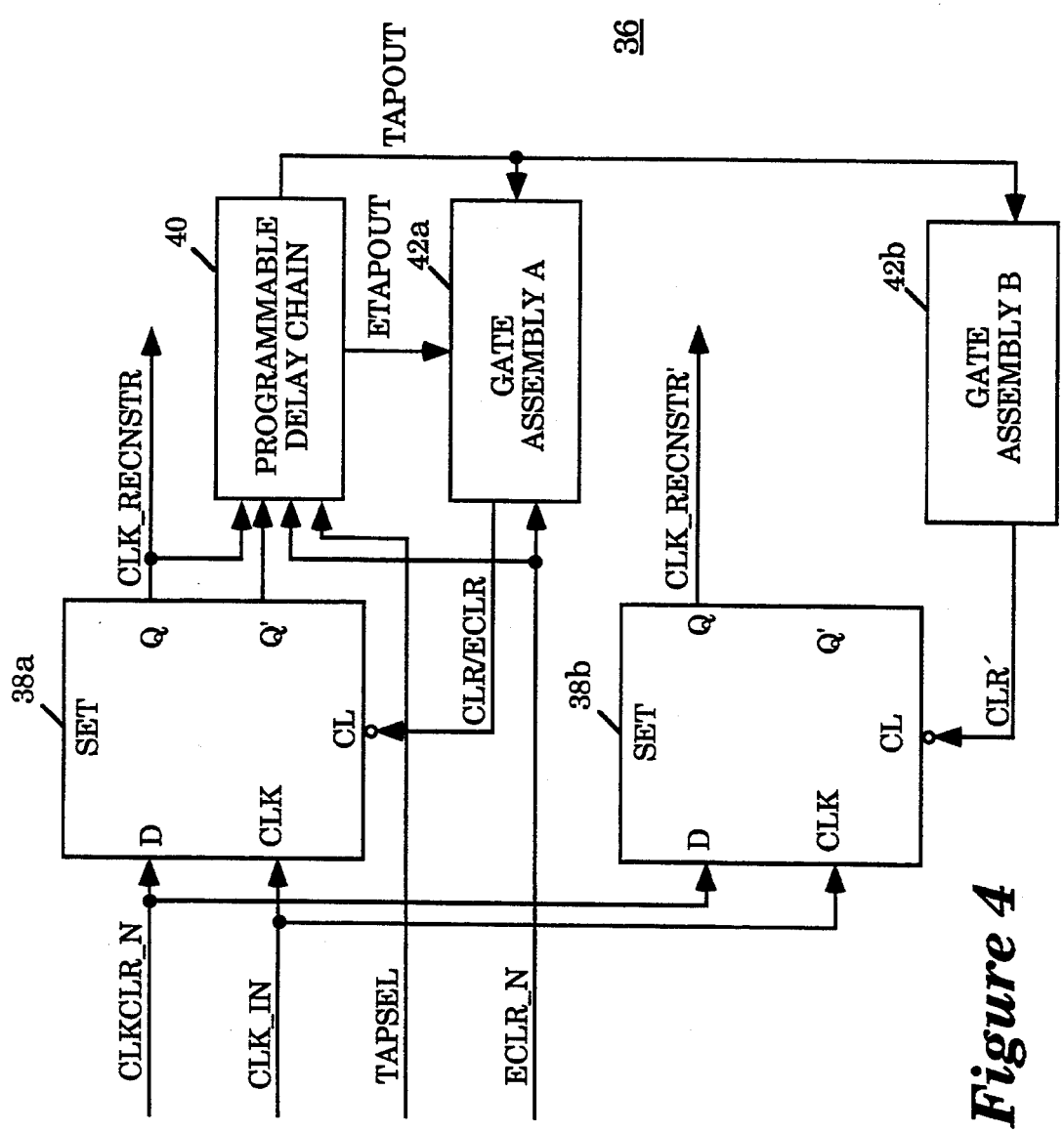
FIG. 4 illustrates the presently preferred embodiment of the digital clock reconstruction circuit of FIG. 3.

Referring now to FIGS. 4 and 5a-5d, a block diagram and four timing diagrams illustrating the preferred embodiment of the digital clock reconstruction of the present invention of FIG. 3 are shown. As illustrated in FIG. 4, the digital clock reconstruction circuit 36 comprises a first flip flop 38a, a programmable delay chain 40, a first assembly of gates 42a, and preferably a second flip flop 38b, and a second assembly of gates 42b. The first flip flop 38a, the programmable delay chain 40, and the first assembly of gates 42a are serially coupled to each other in a circular manner. The programmable delay chain 40 is also coupled to the second assembly of gates 42b, which in turn is coupled to the second flip flop 38b. For this embodiment, the implementation dependent control signals (CONTROLS) provided by the trace control circuitry 32 include a constant high enable (CLKCLR_N), a delay setting selection signal (TAPSEL), and an early clear enable signal (ECLR_N).

Figure 5A:
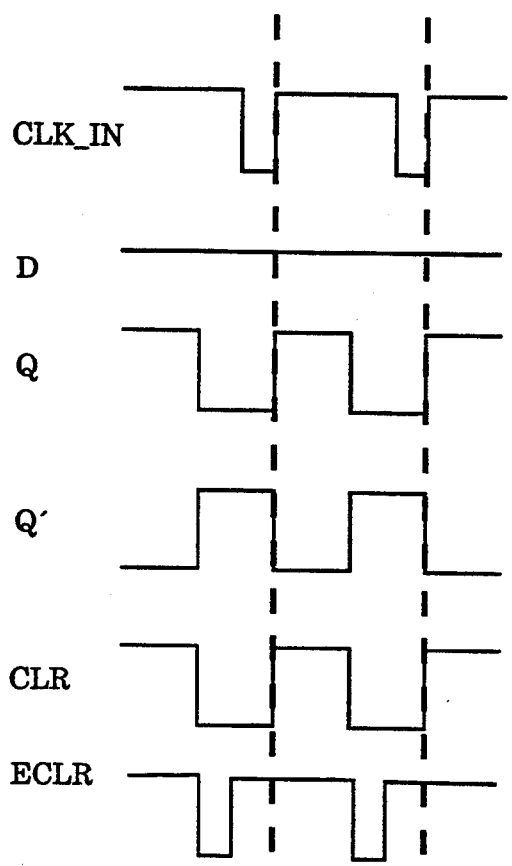
FIGS. 5a–5d illustrate the timing of the various signals for reconstructing the skewed entering digital clock.
Figure 5B:
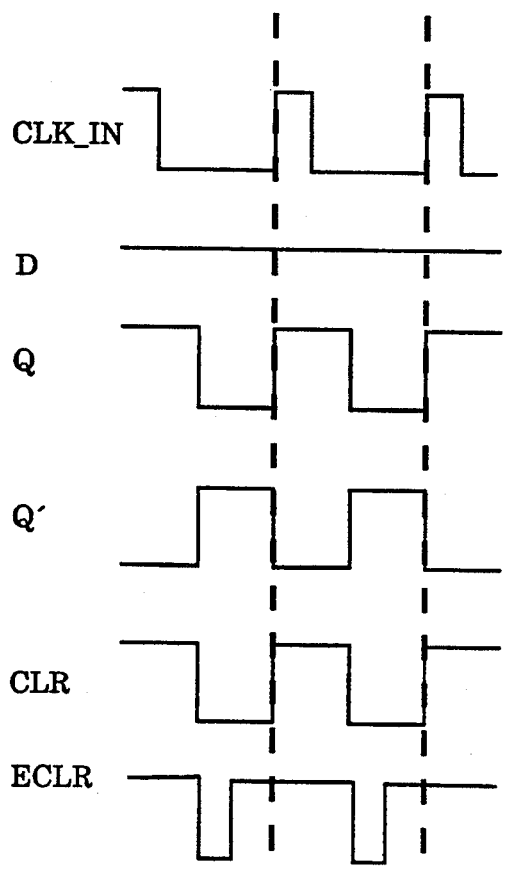

The first flip flop 38a is used to generate CLK_RECNSTR and its complement. The first flip flop 38a is a type D rising clock edge triggered flip flop. The first flip flop 38a receives a constant high enable as its D input, and the entering digital clock as its clock input. At each clock period, with active low not asserted at the clear input, the constant high enable at the D input is clocked into the first flip flop 38a at the rising clock edge of the clock pulse. Concurrently, a logic high and a logic low are clocked out of the first flip flop 38a at the Q and Q' outputs. The Q and Q' outputs remain at high and low respectively, until an active low is asserted at the clear input of the first flip flop 38a, clearing its content and inverting the Q and Q' outputs. At that time, the content of the first flip flop 38a changes to logic low, and the Q and Q' outputs change to logic low and high respectively. The Q and Q' outputs remain at low and high respectively, until the active low is deasserted. As this process continues, CLK_RECNSTR and its complement are generated at the Q and Q' outputs respectively. Thus, as illustrated in FIGS. 5a-5b, if the active low (CLR or ECLR) is asserted at the midpoint of the clock period and deasserted within at most half of a clock period, CLK_RECNSTR will be symmetrical to CLK_IN in frequency, i.e. same number of clocks, and its clock period will be 50% duty cycle symmetric, i.e. an equal amount of high and low time, thereby deskewing the entering clock.

Figure 5C:
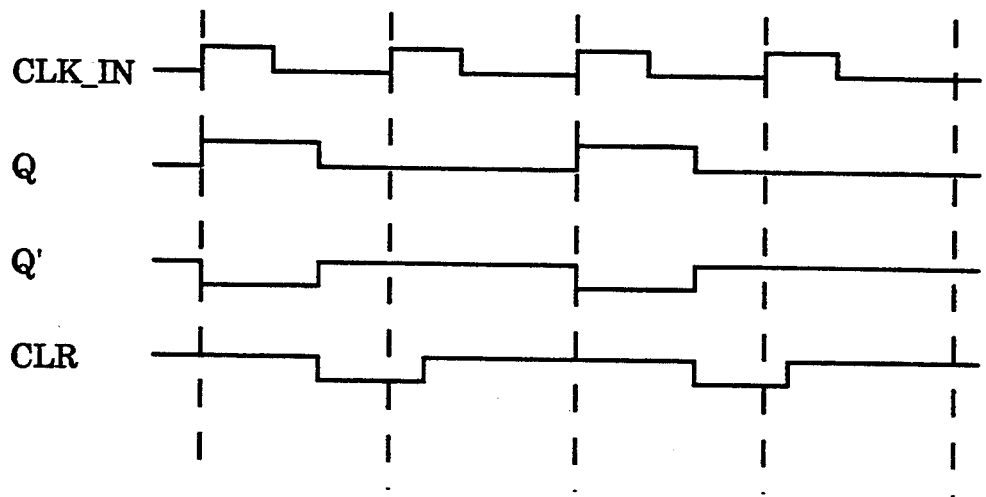
Figure 5D:
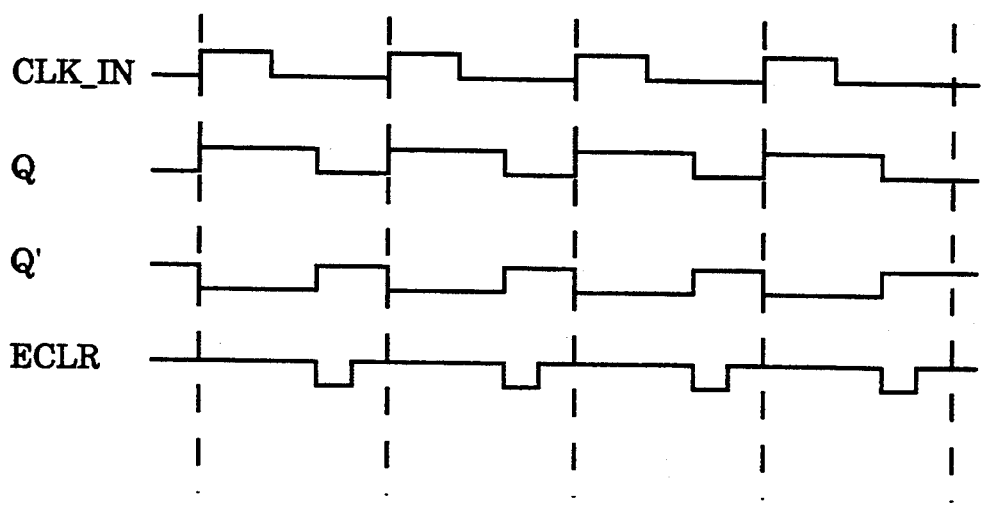

While CLK_RECNSTR and its complement can be generated at the Q and Q' outputs respectively with the active low asserted at the mid-point of the clock period and deasserted just before the new clock period, i.e. CLR, as illustrated in FIG. 5c, a slight drift of CLR causing the active low to be deasserted just after the new clock period will cause CLK_RECNSTR to have at most half of the frequency of the entering clock. Thus, an active low asserted at the mid-point of the clock period and deasserted well before the end of half of a clock period, i.e. ECLR, as illustrated in FIG. 5d, is preferred. ECLR is essentially CLR with a shortened active low in each period. In fact, as will be explained in the descriptions to follow, when the proper timing for CLR is established, the proper timing of ECLR is also established.

As illustrated in FIG. 4, the two versions of active low, CLR and ECLR, are asserted and deasserted at the clear input of the first flip flop 38a by the first gate assembly 42a. The first gate assembly 42a generates CLR and ECLR based on two input signals. TAPOUT and ETAPOUT, it receives from the programmable delay chain 40. The programmable delay chain 40 generates TAPOUT and ETAPOUT based on CLK_RECNSTR and its complement, it receives from the first flip flop 38a, i.e. the Q and Q' outputs. TAPOUT is further dependent on the delay setting selected for the programmable delay chain 40. Thus, the timing of CLR and ECLR are dependent on the timing of TAPOUT and ETAPOUT, and ultimately on the delay setting selected for the programmable delay chain 40. The delay setting for the programmable delay chain 40 is selected using the TAPSEL signal. However, because the operating characteristics of CMOS integrated circuits vary due to process, temperature, and voltage, the effective delay yield of a delay setting has to be determined operationally. Therefore, the proper delay setting for the programmable delay chain 40 is selected with a calibration process. The first gate assembly 42a, and the generation of the CLR and ECLR signals will be described in further detail later, after the programmable delay chain 40, and the generation of the TAPOUT and ETAPOUT signals have been described. The selection of the delay setting for the programmable delay chain 40 will also be described in further detail below.

The second flip flop 38b is used to generate CLK_RECNSTR'. The second flip flop 38b is also a type D rising clock edge triggered flip flop. The second flip flop 38b generates CLK_RECNSTR' in substantially the manner as the first flip flop 38a generates CLK_RECNSTR, except the active low is asserted and deasserted at the clear input of the second flip flop 38b by the second gate assembly 42b. Unlike the first flip flop 38a, there is only one version of the active low, CLR', which is generated by the second gate assembly 42b based on the input signal TAPOUT it receives from the programmable delay chain 40. CLR' is generated by the second gate assembly 42b in a similar manner as CLR is generated by the first gate assembly 42a. As described earlier, the operating characteristics of CMOS integrated circuits vary due to process, temperature and voltage. In particular, the effective delay yield of a selected delay setting for the programmable delay chain 40 increases as temperature increases. As a result of the increased delay, ECLR and CLR' will be asserted after the mid-point of the clock period, thereby increasing the high time of each clock period of CLK_RECNSTR and CLK_RECNSTR' and causing these clocks to drift away from 50% duty cycle symmetry. Additionally, CLR' will be deasserted after a new clock period, causing CLK_RECNSTR' to have at most half of the frequency of CLK_IN. Thus, CLK_

RECNSTR' can be used as a basis during normal operation to provide early warning to the fact that the clock period of CLK_RECNSTR is starting to drift away from 50% duty cycle symmetry. The second gate assembly 42b, and the generation of CLR', will also be described in further detail, after the programmable delay chain 40, and the generation of the TAPOUT and ETAPOUT signals have been described.

Figure 6A:
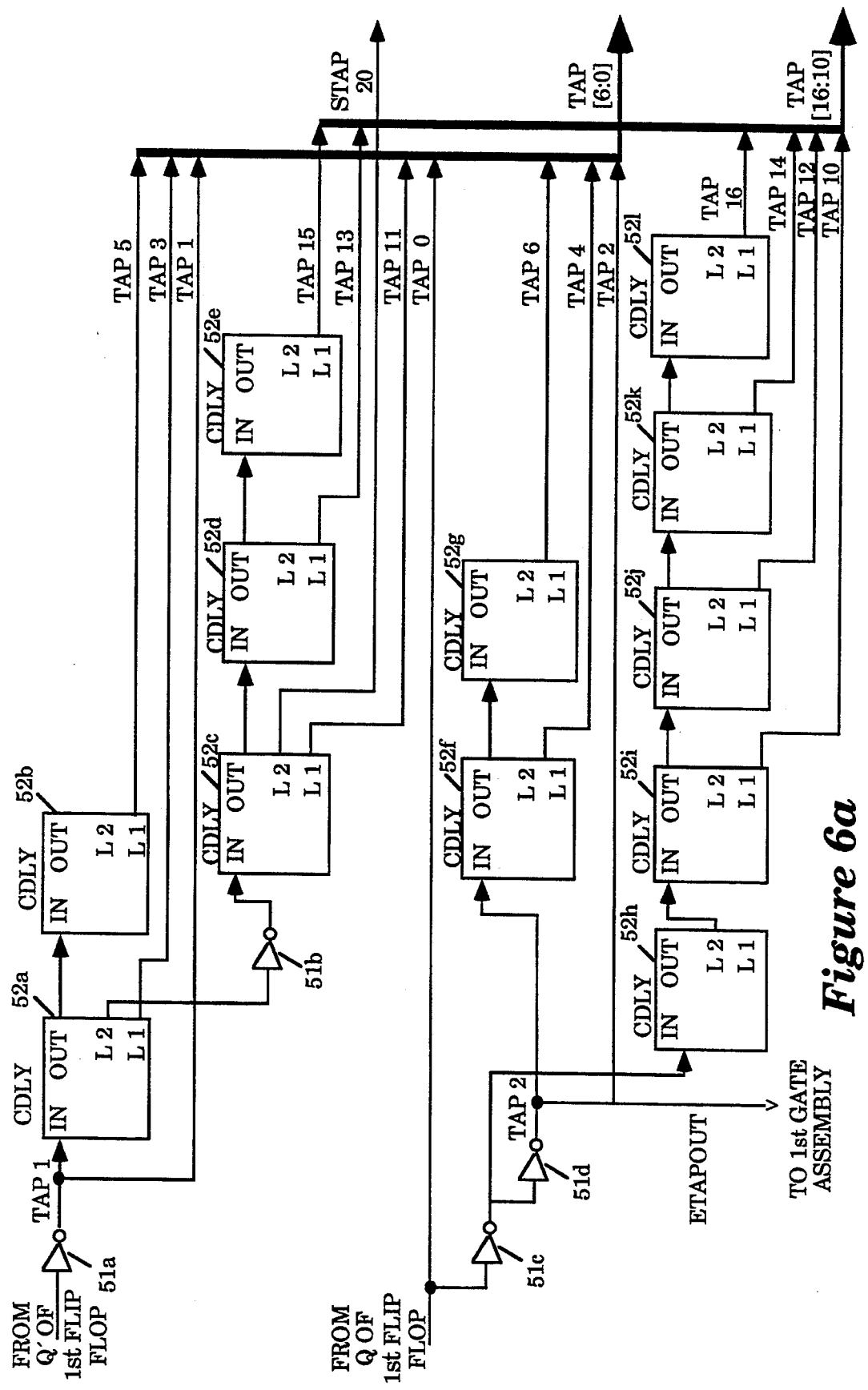
FIGS. 6a–6e illustrate one embodiment of the programmable delay chain of FIG. 4 in further detail.
Figure 6B:
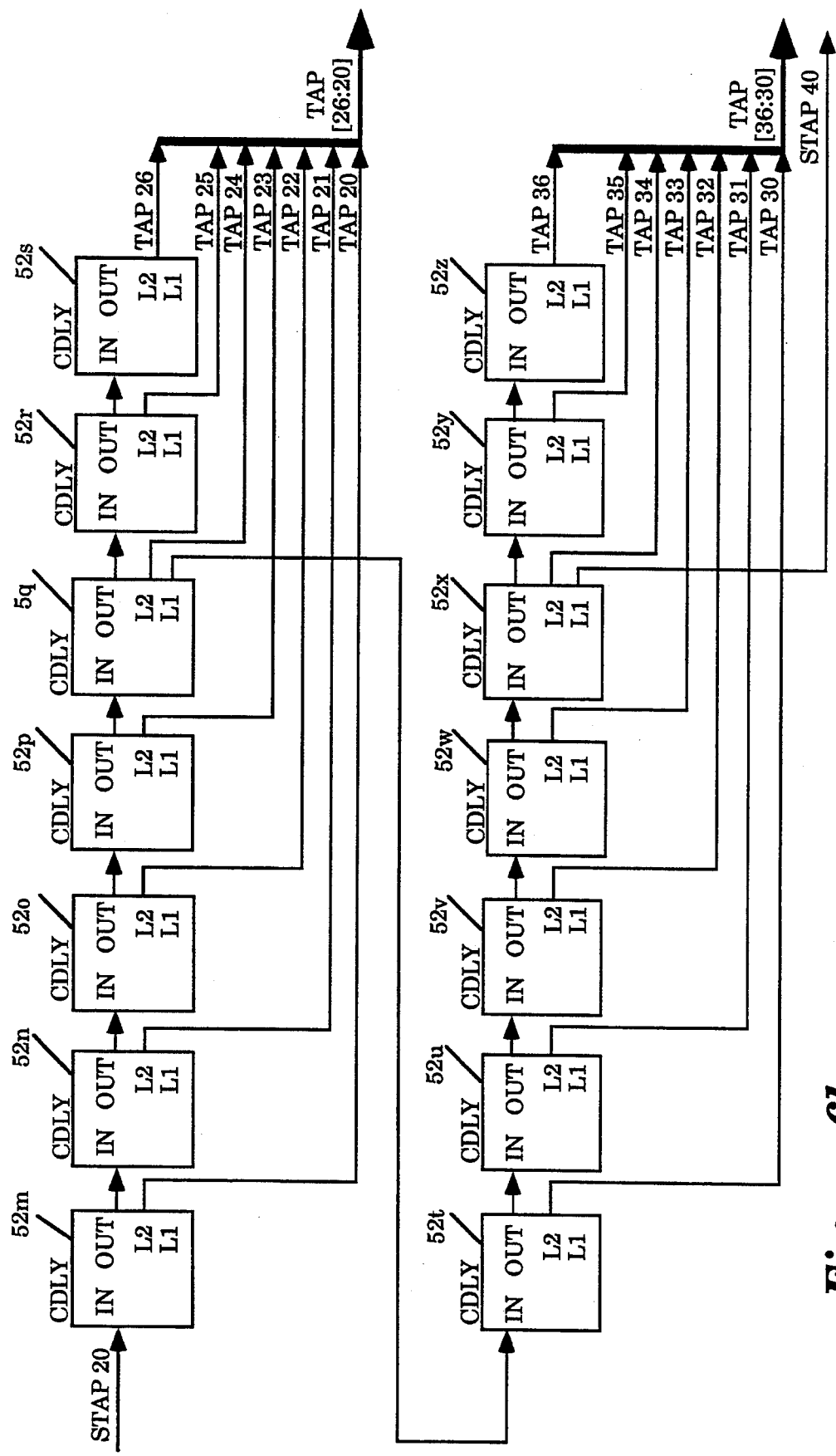
Figure 6C:
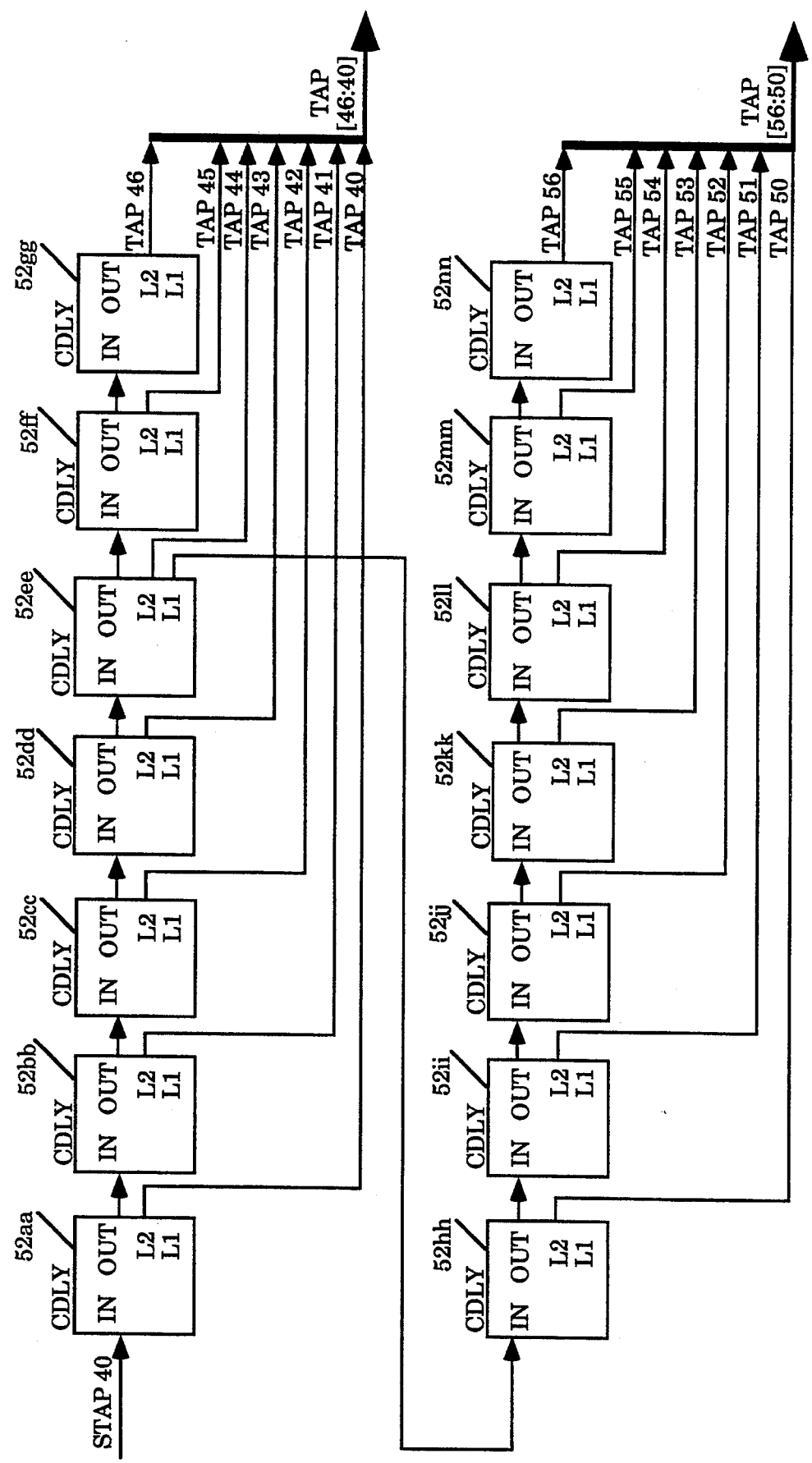
Figure 6D:
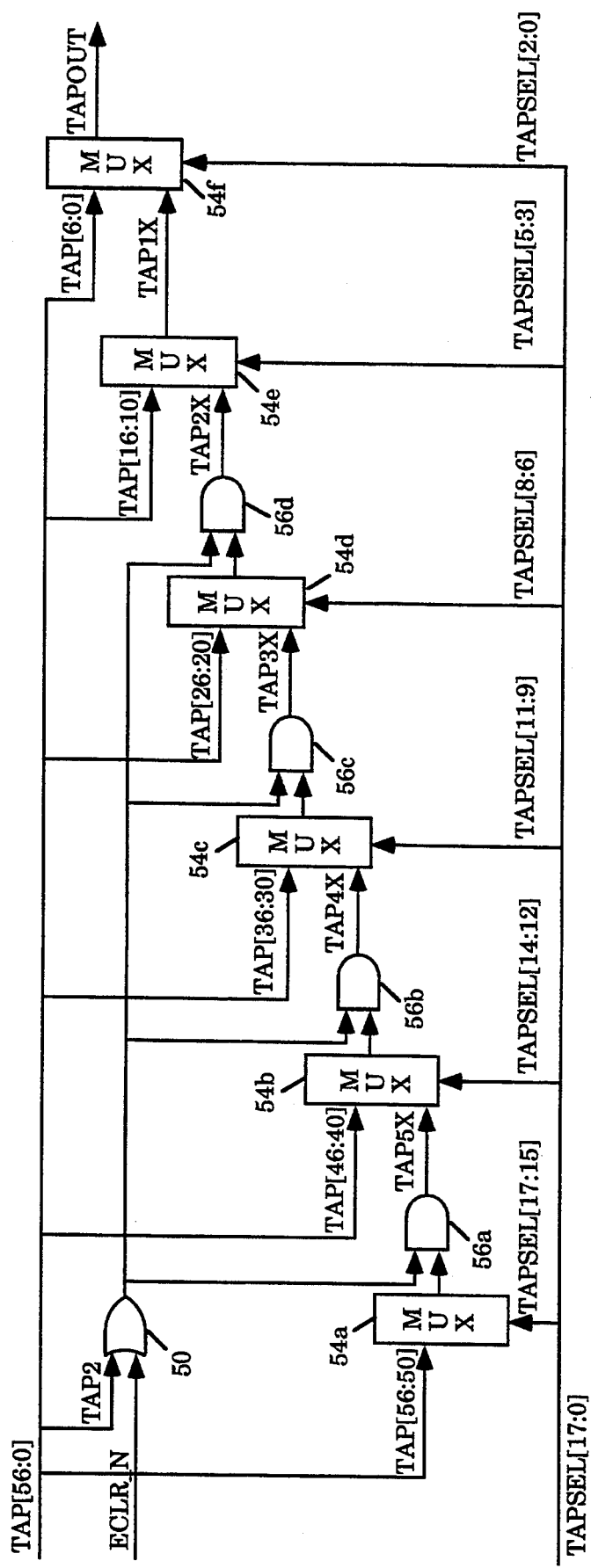

Referring now to FIGS. 6a-6e, six block diagrams illustrating one embodiment of the programmable delay chain of FIG. 4 are shown. As described earlier, the programmable delay chain 40 is used to generate the TAPOUT and ETAPOUT signals. As shown in FIGS. 6a-6c, the programmable delay chain 40 comprises 4 inverters 51a-51d and 40 delay elements 52a-52nn, organized into 8 delay chains. Additionally, as shown in FIG. 6d, the programmable delay chain 40 further comprises 6 multiplexors 54a-54f, coupled to the delay chains, an OR gate 50, and 4 AND gates 56a-56d coupled to the OR gate 50 and the first four multiplexors 54a-54d.

The delay elements 52a-52nn are used to apply various amounts of delays to the Q and Q' output of the first flip flop. In this embodiment, 42 delayed outputs, TAP[6:0], TAP[16:10], TAP[26:20], TAP[36:30], TAP[46:40], and TAP[56:50] are provided. Each delay element 52* is designed to provide a worst case delay resolution of about 1 to 1.5 ns. However, as described earlier, since the operating characteristics of integrated circuits vary due to process, temperature, and voltage, the delay yield of a delay element during operation is not known precisely. The number of delay elements employed and the number of delay chains organized in the programmable delay chain 40 are dependent on the delay resolution requirement of a particular high speed digital circuit. In general, the higher the maximum operating speed, the finer the delay resolution, and therefore, the larger the number of delay elements will be required.

Figure 6E:
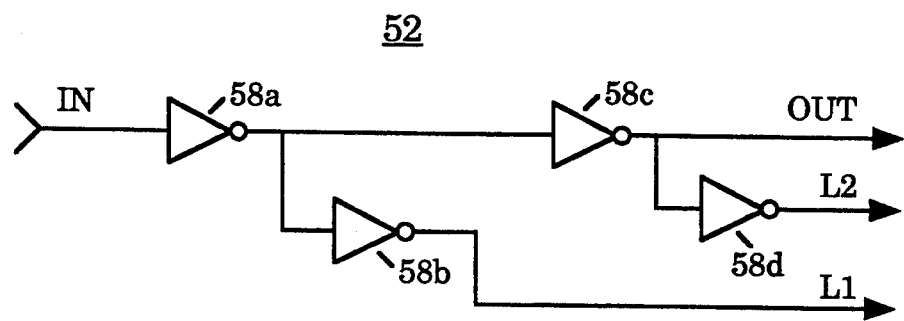

A particular implementation of a delay element 52* comprising a number of inverters 58a-58d is illustrated in FIG. 6e. In this implementation, output OUT and L1 are simply delayed IN, whereas output L2 is delayed and inverted IN of the delay element 52*. Therefore, notwithstanding both Q and Q' outputs of the first flip flop are employed to generate TAP[6:0] through TAP[56:50], since all delays to the Q output of the first flip flop are implemented with even number of inverters, and all delays to the Q' output of the first flip flop are implemented with odd number of inverters, effectively TAP[6:0] through TAP[56:50] are all delays to the Q output of the first flip flop. While the present invention is being described with a programmable delay chain having delay elements comprising inverters, it will be appreciated that the present invention may be practiced with delay elements constituted in other well known manners.

The multiplexors 54a-54f are used to select one of TAP[56:0] for output as TAPOUT based on the delay setting TAPSEL of the programmable delay chain 40. Since the precise delay yield of each of the delay elements 52a-52nn is not known, the delay setting TAPSEL is determined through a calibration process, which will be described in further detail below. As shown in FIG. 6a, one of the earlier TAP[56:0], TAP2 in this embodiment, is preselected for output as ETAPOUT. Thus, through the preselection of one of TAP[56:0] for output as ETAPOUT, and the dynamic selection of one of TAP[56:0] for output as TAPOUT, the timing of CLR, ECLR, and CLR' are controlled.

The OR gate 50 and the AND gates 56a-56d are used to shorten the length of the active time of TAPOUT in each clock period with TAP2 (ECLR_N=0). This is done in concert with the first gate assembly when it uses ETAPOUT (ECLR_N=0) to shorten the length of the active time of CLR in each clock period to provide ECLR instead of CLR to the first flip flop, thereby preventing any additional delays that might be incurred by TAPOUT due to the multiplexors 54a-54f from undermining the shortening of the length of the active low of CLR in each clock period by the first gate assembly.

Figure 7A:
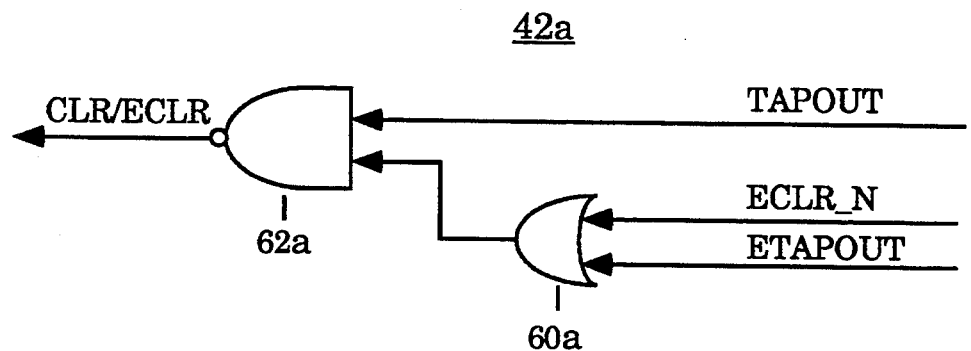
FIGS. 7a–7b illustrate one embodiment of the first and second gate assemblies of FIG. 4 in further detail.
Figure 7B:
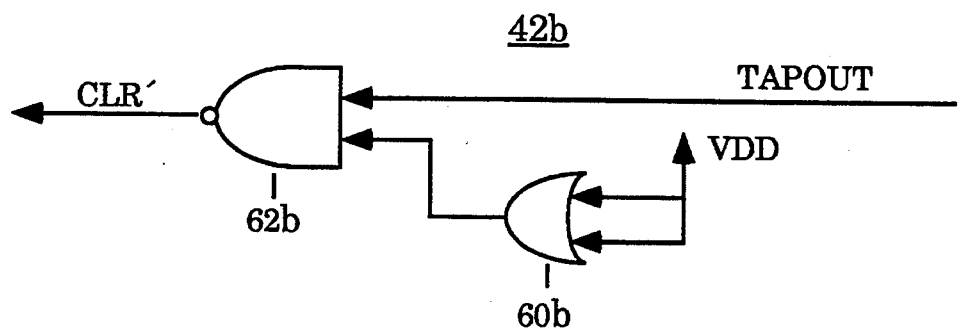

Referring now to FIGS. 7a-7b, two block diagram illustrating one embodiment of the first and second gate assemblies of FIG. 4 in further detail is shown. As described earlier, the first and second gate assemblies 42a-42b are used to provide CLR/ECLR and CLR' to clear the first and second flip flops respectively. Both the first and second gate assemblies 42a-42b comprise a OR gate 60a, 60b and a NAND gate 62a, 62b, coupled to each other. The OR gate 60a of the first gate assembly 42a receives ETAPOUT and ECLR_N as inputs, whereas inputs to the OR gate 60b of the second gate assembly 42b are tied to Vdd. Each of the NAND gate 62a, 62b of the two gate assemblies 42a and 42b receives the output of its OR gate 60a, 60b, and TAPOUT as inputs.

Thus, when ECLR_N is set at logic one (during calibration), the first gate assembly 42a asserts the active low at the clear input of the first flip flop whenever TAPOUT equals logic one, and deasserts the active low at the clear input of the first flip flop whenever TAPOUT equals logic zero, independent of the value of ETAPOUT. However, when ECLR_N is set to logic zero (during normal operation), the first gate assembly 42a asserts the active low at the clear input of the first flip flop only when both TAPOUT and ETAPOUT equal logic one, and deasserts the active low at the clear input of the first flip flop when at least one of TAPOUT and ETAPOUT does not equal logic one. On the other hand, the second gate assembly 42b asserts the active low at the clear input of the second flip flop whenever TAPOUT equals logic one, and deasserts the active low at the clear input of the flip flop whenever TAPOUT equals logic zero, independent of the values of ETAPOUT and ECLR_N.

Figure 8:
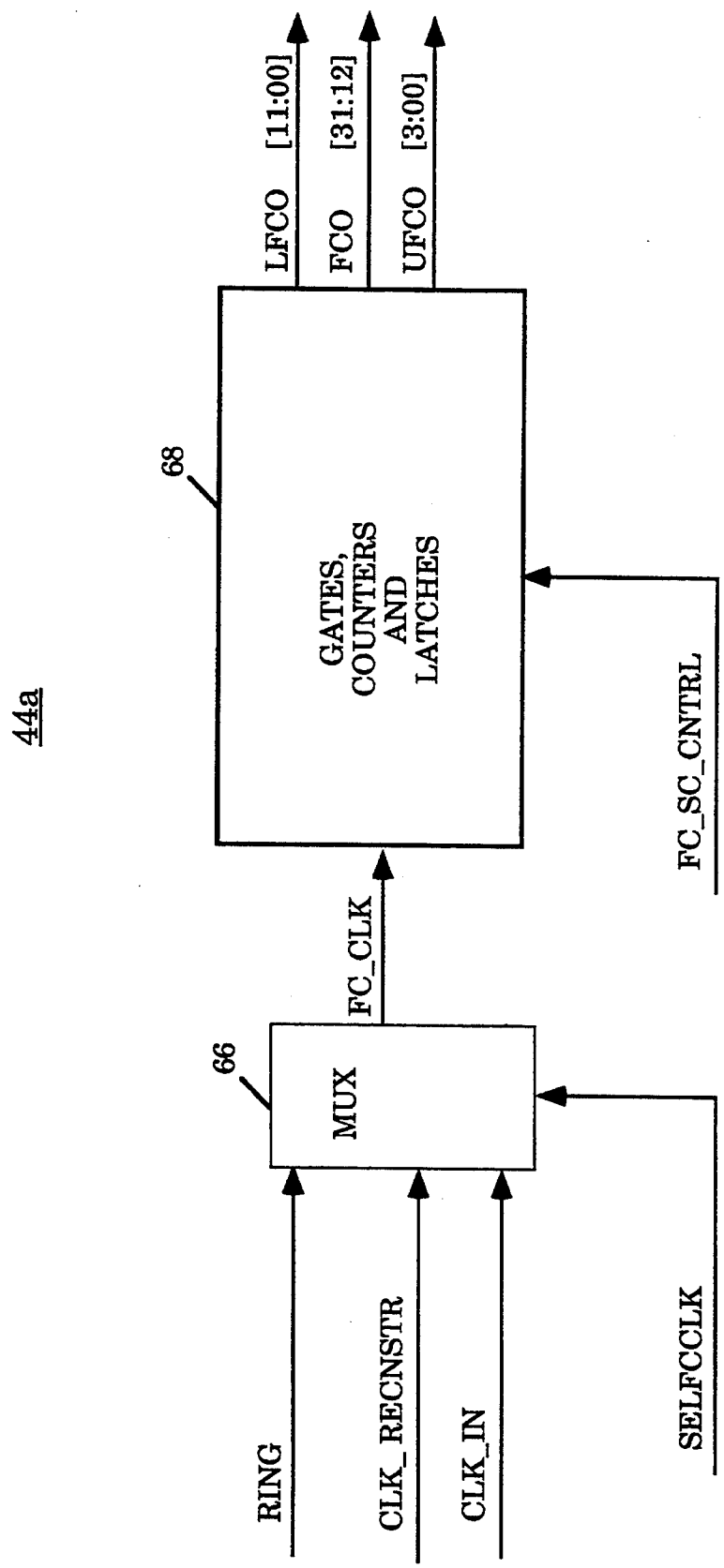
FIG. 8 illustrates one embodiment of a counter-based frequency measurement circuit of one of the measurement/comparison circuits of FIG. 3 in further detail.

Referring now to FIG. 8, a block diagram illustrating one embodiment of a counter-based frequency measuring circuit provided as one of the measurement or comparison circuits of FIG. 3 is shown. The counter-based frequency measuring circuit 44a is used to measure the ring signals and CLK_RECNSTR during calibration, and CLK_RECNSTR and CLK_IN during normal operation, over a selected time period, to determine their respective frequencies. As illustrated in FIG. 8, the counter-based frequency measuring circuit 44a comprises a multiplexor 66 for selecting either a ring signal, CLK_IN or CLK_RECNSTR for measurement, and a number of gates, counters and latches 68 for counting the selected signal over the selected time period. The gates, counters, and latches 68 may be configured in a variety of well known manners, and will not be described in further detail. Preferably, the gates, counters, and latches 68 are configured to accommodate a variety of frequencies.

Figure 9:
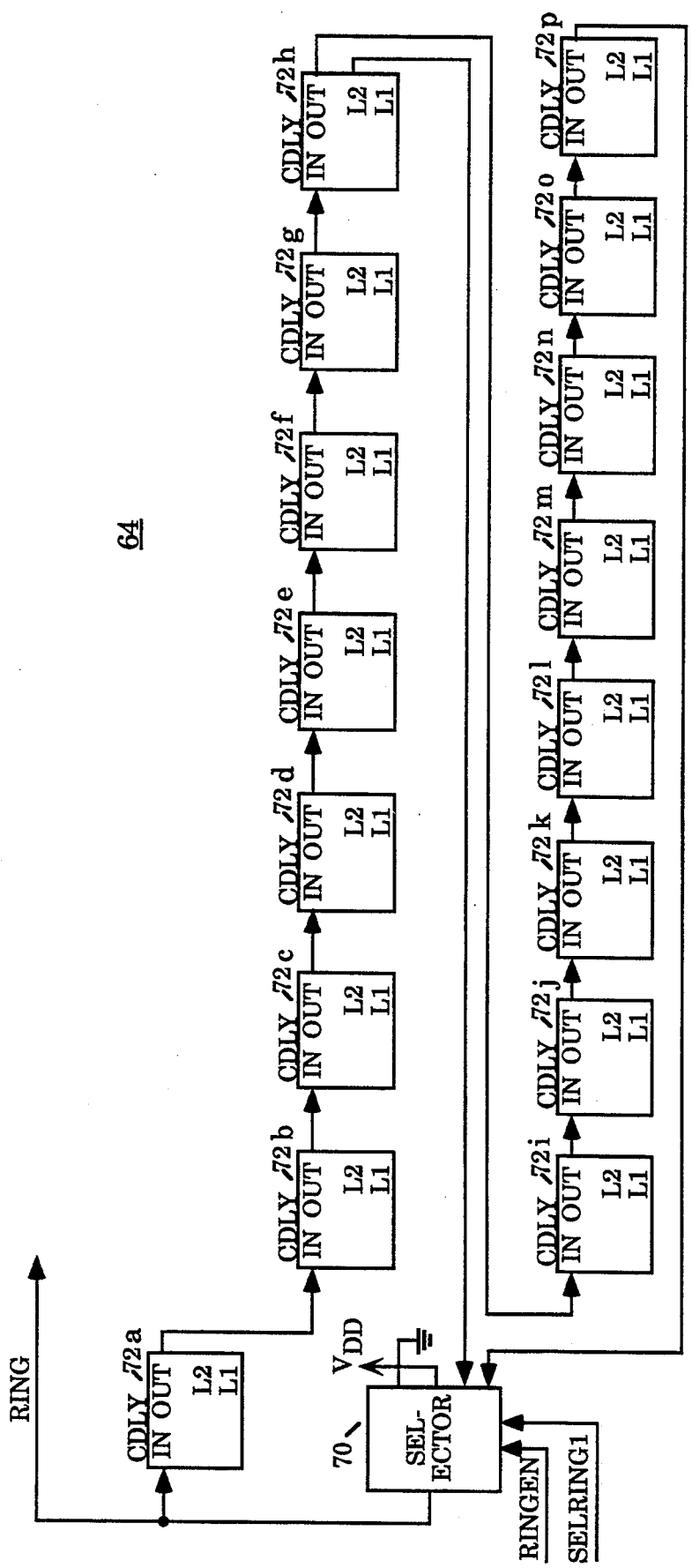
FIG. 9 illustrates one embodiment of the ring oscillator of FIG. 3 in further detail.

Referring now to FIG. 9, a block diagram illustrating one embodiment of the ring oscillator of FIG. 3 is shown. The ring oscillator 64 is used during calibration to generate a number of ring signals. The ring oscillator 64 comprises a selector 70, a number of delay elements 72a–72p identical to those used for the programmable delay chain, organized into two rings of predetermined length and coupled to the selector 70. Since the number of delay elements 72* in each ring is predetermined, thus by measuring the frequencies of various ring signals generated by these rings, the operational delay yield of the delay elements can be estimated.

Referring back to FIG. 3, as described earlier, preferably multiple measurement or comparison circuits 44 are provided to each TAR. In the presently preferred embodiment, the measurement or comparison circuits 44 further comprise the delay line and register-based frequency and high/low time measuring circuit described in copending U.S. patent application, Ser. No. 08/040,623, entitled Method and Apparatus for Measuring The Frequency And High/Low Time Of A Digital Signal, assigned to the assignee of the present invention, which is fully incorporated by reference herein. The frequency and high/low time measuring circuit is used to measure the frequency and high/low time of a period of CLK_RECNSTR, during calibration and normal operation. The frequency and high/low time measuring circuit described in the copending application comprises a delay line, two registers coupled to the delay line, and a set of multiplexors coupled to the two registers. The delay line is constructed with delay elements identical to those contained in the programmable delay chain. The delay line has a number delayed outputs, each delayed output has an additional equal amount of delay applied to the input signal, i.e. the second delay output has twice the amount of delay applied to the first delay output, the third delay output has three times the amount of delay applied to the first delay output, etc. etc. Each of the two registers has a number a bits corresponding to the delay outputs of the delay line, one bit per delay output.

As applied to the present invention, the delay line receives CLK_RECNSTR as input. The delayed outputs are sampled at two different points in time, and the sampled results are stored in the two registers. Based on the amount of elapsed time between the two samples, and the differences between the two sample results, the frequency, as well as the high/low time of a period, of CLK_RECNSTR can be computed. For more detailed description of the circuit, see the copending application.

Still referring to FIG. 3, in the presently preferred embodiment, the measurement or comparison circuits 44 further comprise the counter-based frequencies comparison circuit described in copending U.S. patent application, Ser. No. 08/040,477, entitled Method and Apparatus for Testing Frequency Symmetry Of Two Digital Signals, assigned to the assignee of the present invention, which is fully incorporated by reference herein. The frequencies comparison circuit is used to compare the frequencies of CLK_RECNSTR and CLK_IN, during calibration and normal operation. Additionally, the frequencies comparison circuit is used to compare the frequencies of CLK_RECNSTR' and CLK_IN during normal operation. The frequencies comparison circuit described in the copending application comprises two input generating circuits, two sets of counters, and two comparison circuits. The two sets of counters are correspondingly coupled to the input generating circuits and the two comparison circuits. Additionally, the first comparison circuit is also coupled to the first and second input generating circuits.

As applied to the present invention, the first and second input generating circuits receive CLK_IN and either CLK_RECNSTR or CLK_RFCNSTR' as their clock inputs respectively, and in turn use them to generate enable inputs for the corresponding counters. The counters receive CLK_IN, either CLK_RECNSTR or CLK_RECNSTR', and the enable signals as inputs, and count the input clocks while the enable signals are provided. The first comparison circuit monitors the first set of counters, and stops both input generating circuits from providing further enable inputs to both sets of counters, after the first set of counters reaches a predetermined level, thereby stopping both sets of counters from further counting. The second comparison circuit monitors the second set of counters, and issues a control signal indicating the input signals are symmetric to each other in frequency, if the second set of counters also stops substantially at the predetermined level, i.e. within a predetermined acceptable threshold. In the presently preferred embodiment, when measuring CLK_RECNSTR' and CLK_IN during normal operation, the control signal is also used to trigger an interrupt indicating the clock period of CLK_RECNSTR is starting to drift away from 50% duty cycle symmetry if the control signal indicates the frequency of CLK_RECNSTR' has drifted away from CLK_IN beyond the predetermined acceptable threshold. For more detailed description of the circuit, see the copending application.

Figure 10:
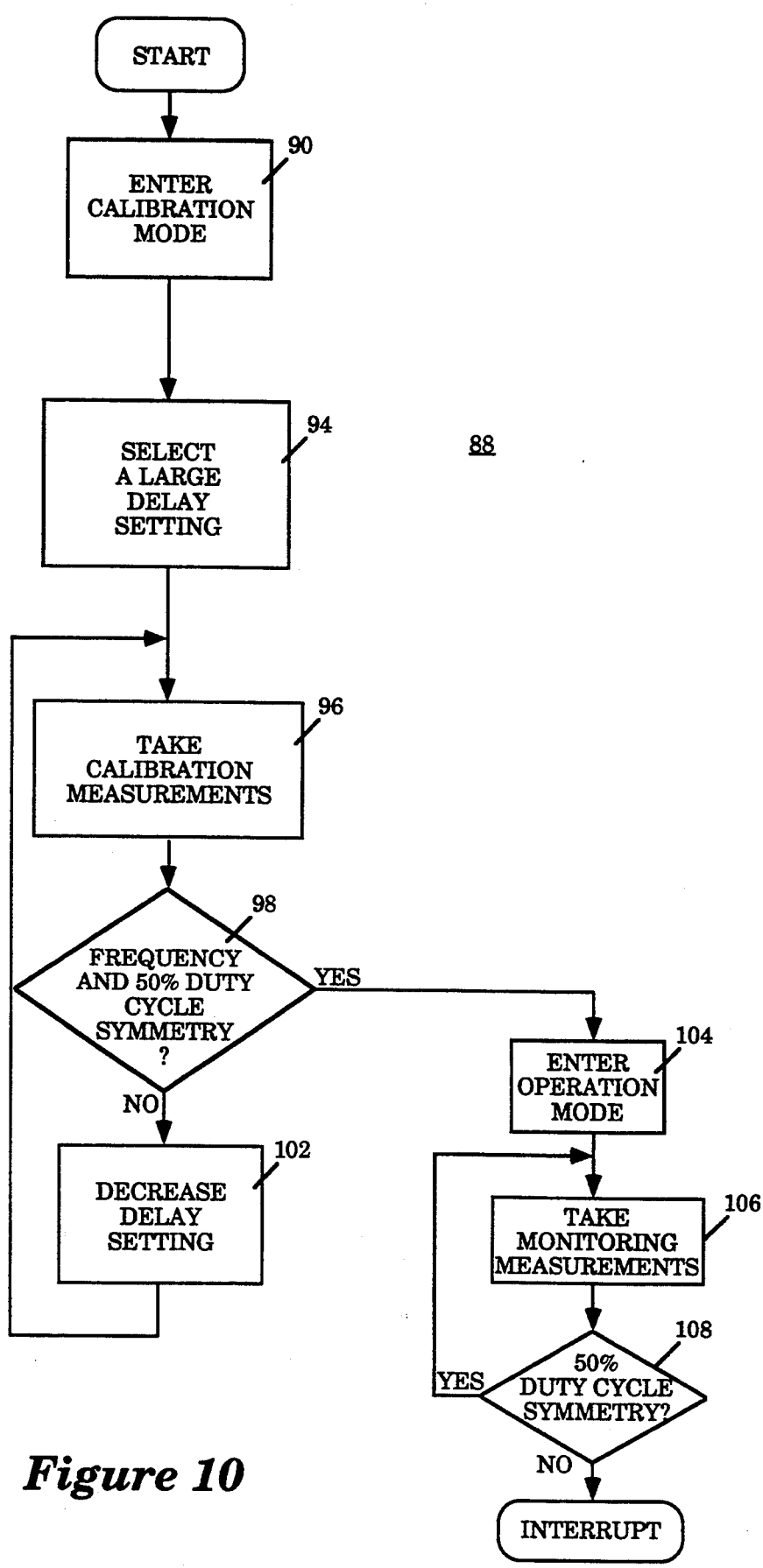
FIG. 10 illustrates the method of the present invention.

Referring now to FIG. 10, a block diagram illustrating the method of the present invention is shown. Initially, the programmable delay chain and the first gate assembly of the digital clock reconstruction circuit are put into calibration mode by setting ECLR_N to logic one step 90. Under the presently preferred embodiment, a large initial delay setting is selected for the programmable delay chain, by selecting one of the larger delays to the Q output of the flip flop to be output as TAP-OUT, step 94. Then, various calibration measurements are taken with a maximum operating frequency calibration clock provided as CLK_IN using the various measurement and comparison circuits provided, step 96. If CLK_RECNSTR is not symmetric to CLK_IN in frequency, or its period is not 50% duty cycle symmetric, no branch of step 98, the delay setting for the programmable delay chain is decreased, and steps 96–98 are repeated. Since the search for proper delay setting starts with a large delay setting and decremented towards the lower delay settings, 50% duty cycle symmetry for the reconstructed period will be achieved simultaneously when frequency symmetry is achieved between CLK_RECNSTR and CLK_IN. Since the calibration is performed with the maximum operating frequency, once the proper delay setting for the programmable delay chain is determined, the minimum amount of high and low time required by the TAR will be provided regardless of the ultimate operating speed.

While it is preferred to calibrate the clock reconstruction circuit starting with a large initial delay setting and decrement the delay setting systematically, it will be appreciated that the clock reconstruction circuit may be calibrated with other initial delay settings and other manners of systematically varying the delay setting. In particular, the clock reconstruction circuit may be calibrated starting with a small initial delay setting and increment the delay setting systematically as long as CLK_RECNSTR is symmetric to CLK_IN in frequency. Under this approach, the proper delay setting is the delay setting just prior to the delay setting that causes CLK_RECNSTR to have at most half of the frequency of CLK_IN (CLR being deasserted just after a new clock period). At this delay setting, frequency symmetry between CLK_RECNSTR and CLK_IN, and 50% duty cycle symmetry for the reconstructed clock period are also simultaneously achieved.

Once frequency symmetry between CLK_RECNSTR and CLK_IN and 50% duty cycle symmetry for the reconstructed period are achieved, yes branch of step 98, the programmable delay chain and the first gate assembly of the digital reconstruction clock is put into operation mode by setting ECLR_N to logic zero step 104. Various operational monitoring measurements are taken and analyzed using the various measurement and comparison circuits provided, step 106. If at any time, the clock period of CLK_RECNSTR is starting to drift away from 50% duty cycle symmetry, yes branch of step 108, an interrupt is triggered. Otherwise, no branch of step 108, steps 106 and 108 are repeated. It will be appreciated that the entire calibration process 88 may be controlled by either hardware or software.

In the presently preferred embodiment, the selection of the initial large delay setting in step 94 is guided by the delay yield estimate for the delay elements of the programmable delay chain. The delay yield is estimated by measuring the frequencies of the ring signals generated by the ring oscillator using the counter-based frequency measuring circuit. In step 96, the frequency of CLK_RECNSTR is measured using the counter-based frequency measurement circuit as well as being compared to CLK_IN using the frequencies comparison circuit. The high and low time of the reconstructed period is also measured, notwithstanding 50% duty cycle symmetry in the reconstructed period will be achieved simultaneously when frequency symmetry is achieved between CLK_RECNSTR and CLK_IN under the calibration process of the present invention. In step 106, CLK_RECNSTR is also measured and compared to CLK_IN periodically using the various measurement and comparison circuits, in addition to measuring and comparing CLK_RECNSTR' to CLK_IN periodically using the frequencies comparison circuit.

Additionally, because CLK_RECNSTR' is used as a basis to provide early warning to the fact that the clock period of CLK_RECNSTR is starting to drift away from 50% duty cycle symmetry, a delay setting slightly smaller than the optimal delay setting is selected for the programmable delay chain to provide a small 50% duty cycle symmetry drifting range for the clock period of CLK_RECNSTR without triggering the early warning.

Alternatively, steps 94-102 may be performed by applying a preset to the first flip flop of the digital clock reconstruction circuit, in lieu of providing a maximum operating frequency calibration clock as CLK_IN. The digital clock reconstruction circuit is functionally transformed into a ring oscillator. Under this approach, steps 96-102 are repeated until the maximum operating frequency is measured for CLK_RECNSTR. At this time, 50% duty cycle symmetry for the reconstructed period will also be achieved simultaneously. However, under this alternative, the clear input of the flip flop must have priority over its preset input.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital system comprising a digital clock, a first and a second high speed digital circuit coupled to each other, an apparatus for digitally compensating clock skew in said digital clock as said digital clock enters said second high speed digital circuit after having traveled through said first high speed digital circuit, said apparatus comprising:

a) digital clock reconstruction circuitry coupled to said first high speed digital circuit for receiving said entering digital clock, and generating a first reconstructed digital clock and a complement of said first reconstructed digital clock, said digital clock reconstruction circuitry being also provided with a constant high enable and a first clear signal as inputs, said first reconstructed digital clock and said complement of said first reconstructed digital clock being generated using said received entering digital clock, constant high enable and first clear signal;

b) programmable delay circuitry coupled to said digital clock reconstruction circuitry having variable delay capability for receiving said generated first reconstructed digital clock and said complement of said first reconstructed digital clock, and generating a first clear control signal, said programmable delay circuitry being also provided with a delay setting selection signal indicating the amount of delay said programmable delay circuitry should employ in generating said first clear control signal, said first clear control signal being generated using said first received generated reconstructed digital clock, said complement of said first reconstructed digital clock, and said delay setting selection signal; and c) gate circuitry coupled to said programmable delay circuitry and said digital clock reconstruction circuitry for receiving said first clear control signal, and generating said first clear signal for said digital clock reconstruction circuitry using said received first clear control signal.

2. The apparatus as set forth in claim 1, wherein, said digital clock reconstruction circuitry comprises a flip flop coupled to said first high speed digital circuit and said gate circuitry for receiving said entering digital clock, said constant high enable and said first clear signal as inputs, and generating said first reconstructed digital clock and said complement of said first reconstructed digital clock by clocking said constant high enable into said flip flop at the rising clock edge of each clock period of said entering digital clock, concurrently clocking said constant high enable and a complement of said constant high enable out of said flip flop, and then clearing said flip flop and said flip flop's outputs upon receipt of said first clear signal.

3. The apparatus as set forth in claim 1, wherein, said programmable delay circuitry comprises:

b.1) a plurality of chained identical delay elements coupled to said digital clock reconstruction circuitry for receiving said first reconstructed digital clock and said complement of said first reconstructed digital clock, and generating a plurality of delayed first reconstructed digital clocks; and b.2) a plurality of multiplexors coupled to said delay elements for receiving said generated plurality of delayed first reconstructed digital clocks, and dynamically selecting one of said received delayed first reconstructed digital clocks for output as said first clear control signal.

4. The apparatus as set forth in claim 3, wherein,
said programmable delay circuitry further generates a second clear control signal, said second clear control signal being a preselected one of said delayed first reconstructed digital clocks;
said programmable delay circuitry further comprises b.3) an assembly having an OR gate and a plurality of AND gates coupled to said delay elements and said multiplexors for receiving said proselected one of said delayed first reconstructed digital clocks and a calibration/operation control signal, and modifying said dynamically selected delayed first reconstructed digital clock based on said calibration/operation control signal before outputting said modified dynamically selected delayed first reconstructed digital clock as said first clear control signal, said calibration/operation control signal indicating whether said apparatus is operating in a calibration or an operation mode.

5. The apparatus as set forth in claim 4, wherein, said gate circuitry comprises:

c.1) an OR gate coupled to said delay elements of said programmable delay chain for receiving said preselected one of said delayed first reconstructed digital clocks and said calibration/operation control signal as inputs, and outputting the logical OR result of said OR gate's received inputs; and c.2) a NAND gate coupled to said programmable delay chain for receiving said first clear control signal and said logical OR result, and outputting the logical NAND result of of said NAND gate's received inputs as said first clear signal.

6. The apparatus as set forth in claim 1, wherein, said gate circuitry comprises a NAND gate coupled to said programmable delay circuitry for receiving said first clear control signal and a logical one as inputs, and outputting the logical NAND result of said NAND gate's received inputs as said first clear signal.

7. The apparatus as set forth in claim 1, wherein, said apparatus further comprises d) measurement circuitry coupled to said digital clock reconstruction circuitry for measuring frequency of said first reconstructed digital clock.

8. The apparatus as set forth in claim 7, wherein, said measurement circuitry further measures clock period high and low time of said first reconstructed digital clock.

9. The apparatus as set forth in claim 1, wherein, said apparatus further comprises d) comparison circuitry coupled to said digital clock reconstruction circuitry and said first high speed digital circuit for receiving said entering digital clock and said first reconstructed digital clock and comparing frequencies of said entering digital clock and said first reconstructed digital clock.

10. The apparatus as set forth in claim 1, wherein, said apparatus further comprises d) ring generation circuitry comprising a plurality of rings of known length having delay elements identical to delay elements used by said programmable delay circuitry for generating a number of ring signals.

11. The apparatus as set forth in claim 1, wherein, the value of said delay setting selection signal provided to said programmable delay circuitry is determined through a calibration process by repeatedly measuring frequencies of said first reconstructed digital clock under various trial values of said delay setting selection signal, starting with an initial trial value and varying the trial value systematically in a predetermined manner.

12. The apparatus as set forth in claim 11, wherein,
said initial trial value is a very large trial value, and the trial value is decremented systematically towards smaller trial values; and
said digital clock traveling through said first high speed digital circuit and entering said second high speed digital circuit is a maximum operating frequency calibration clock of said second high speed digital circuit.

13. The apparatus as set forth in claim 11, wherein,
said digital clock reconstruction circuitry comprises a flip flop coupled to said first high speed digital circuit and said gate circuitry for receiving said entering digital clock, said constant high enable and said first clear signal as inputs, and generating said first reconstructed digital clock and said complement of said first reconstructed digital clock by clocking said constant high enable into said flip flop at the rising clock edge of each clock period of said entering digital clock, concurrently clocking said constant high enable and a complement of said constant high enable out of said flip flop, and then clearing said flip flop and said flip flop's outputs upon receipt of said first clear signal; and
said calibration process is performed with a preset presetting said flip flop in lieu of receiving said entering digital clock from said first high speed digital circuit.

14. The apparatus as set forth in claim 1, wherein the value of said delay setting selection signal provided to said programmable delay circuitry is determined through a calibration process by repeatedly comparing frequencies of said first reconstructed digital clock under various trial values of said delay setting selection signal to frequency of said entering digital clock, starting with an initial trial value and varying the trial value systematically in a predetermined manner, said entering digital clock being a maximum operating frequency calibration clock of said second high speed digital circuit.

15. The apparatus as set forth in claim 14, wherein, said initial trial value is a very large value, and the trial value is decremented systematically towards the smaller trial values.

16. The apparatus as set forth in claim 1, wherein,
said digital clock reconstruction circuitry further receives a second clear signal, and generates a second reconstructed digital clock using said entering digital clock, said constant high enable, and said second clear signal, said second reconstructed digital clock being used as a basis for providing early warning against said first reconstructed digital clock drifting away from having a 50% duty cycle symmetric reconstructed clock period; and
said gate circuitry further generates said second clear signal using said first clear control signal.

17. The apparatus as set forth in claim 16, wherein, said digital clock reconstruction circuitry comprises a first and a second flip flop coupled to said first high speed digital circuit and said gate circuitry for receiving said entering digital clock, said constable high enable and said first and second clear signals as inputs, and generating said first and second reconstructed digital clocks and said complement of said first reconstructed digital clock by clocking said constable high enable into said first and second flip flops at the rising clock edge of each clock period of said entering digital clock, concurrently clocking said constable high enable out of said first and second flip flops and a complement of said constable high enable out of said first flip flop, and then clearing said first and second flip flops and said first and second flip flops' outputs upon receipt of said first and second clear signals.

18. The apparatus as set forth in claim 16, wherein, said gate circuitry comprises:
 c. 1) an OR gate coupled to delay elements of said programmable delay circuitry for receiving a preselected one of said delayed first reconstructed digital clocks and a calibration/operation control signal as inputs, and outputting the logical OR result of said OR gate's received inputs, said calibration/operation control signal indicating whether said apparatus is operating in a calibration or an operation mode;
 c.2) a first NAND gate coupled to said programmable delay circuitry and said OR gate for receiving said first clear control signal and said logical OR result, and outputting the logical NAND result of said first NAND gate's received inputs as said first clear signal; and
 c.3) a second NAND gate coupled to said programmable delay circuitry for receiving said first clear control signal and a logical one, and outputting the logical NAND result of said second NAND gate's received inputs as said second clear signal.

19. The apparatus as set forth in claim 16, wherein, said gate circuitry comprises:
 c.1) a first NAND gate coupled to said programmable delay circuitry for receiving said first clear control signal and a first logical one as inputs, and outputting the logical NAND result of said first NAND gate's received inputs as said first clear signal; and
 c.2) a second NAND gate coupled to said programmable delay circuitry for receiving said first clear control signal and a second logical one as inputs, and outputting the logical NAND result of of said second NAND gate's received inputs as said second clear signal.

20. In a digital system comprising a digital clock, a first and a second high speed digital circuit coupled to each other, a method for digitally compensating clock skew in said digital clock as said digital clock enters said second high speed digital circuit after having traveled through said first high speed digital circuit, said method comprising the steps of:
 a) generating a first reconstructed digital clock and a complement of said first reconstructed digital clock using said entering digital clock, a constable high enable and a first clear signal;
 b) generating a first clear control signal using said first reconstructed digital clock, said complement of said first reconstructed digital clock, and a delay setting selection signal, said delay setting selection signal indicating an amount of delay to be applied to said first reconstructed digital clock and said complement of said first reconstructed digital clock in generating said first clear control signal; and
 c) generating said first clear signal using said first clear control signal.

21. The method as set forth in claim 20, wherein, said first reconstructed digital clock and said complement of said first reconstructed digital clock are generated in said step a) using a flip flop for receiving said entering digital clock, said constant high enable and said first clear signal as inputs, and generating said first reconstructed digital clock and said complement of said first reconstructed digital clock by clocking said constant high enable into said flip flop at the rising clock edge of each clock period of said entering digital clock, concurrently clocking said constant high enable and a complement of said constant high enable out of said flip flop, and then clearing said flip flop and said flip flop's outputs upon receipt of said first clear signal.

22. The method as set forth in claim 20, wherein, said step b) comprises
 b.1) applying a plurality of delays to said first reconstructed digital clock and said complement of said first reconstructed digital clock, and generating a plurality of delayed first reconstructed digital clocks; and
 b.2) dynamically selecting one of said received delayed first reconstructed digital clocks for output as said first clear control signal.

23. The method as set forth in claim 22, wherein,
 said step b) further comprises generating a second clear control signal, said second clear control signal being a proselected one of said delayed first reconstructed digital clocks;
 said step b) further comprises the step of b.3) performing a plurality of logical OR and AND operations to modify said dynamically selected delayed first reconstructed digital clock before outputting said modified dynamically selected delayed first reconstructed digital clock as said first clear control signal, using said preselected one of said delayed first reconstructed digital clocks and a calibration/operation control signal, said calibration/operation control signal indicating whether said apparatus is operating in a calibration or an operation mode.

24. The method as set forth in claim 23, wherein said step c) comprises the steps of:
 c.1) performing a logical OR operation using said preselected one of said delayed first reconstructed digital clocks and a calibration/operation control signal, and outputting the logical OR result; and
 c.2) performing a logical NAND operation using said first clear control signal and said logical OR result, and outputting the logical NAND result as said first clear signal.

25. The method as set forth in claim 20, wherein, said step c) comprises performing a logical NAND operation using said first clear control signal and a logical one, and outputting the logical NAND result as said first clear signal.

26. The method as set forth in claim 20, wherein, said method further comprises the step of d) measuring frequency of said first reconstructed digital clock.

27. The method as set forth in claim 26, wherein, said step d) further comprises measuring clock period high and low time of said first reconstructed digital clock.

28. The method as set forth in claim 20, wherein, said method further comprises the step of d) comparing said entering digital clock and frequencies of said first reconstructed digital clock.

29. The method as set forth in claim 20, wherein, said method further comprises the steps of d) generating a number of ring signals using a plurality of rings of known length having delay elements identical to delay elements used to generate said first clear control signal.

30. The method as set forth in claim 20, wherein the value of said delay setting selection signal provided is determined through a calibration process by repeatedly measuring frequencies of said first reconstructed digital clock under various trial values of said delay setting selection signal, starting with an initial trial value and varying the trial value systematically in a predetermined manner.

31. The method as set forth in claim 30, wherein,
said initial trial value is a very large value, and the trial value is decremented systematically towards the smaller values; and
said digital clock traveling through said first high speed digital circuit and entering said second high speed digital circuit is a maximum operating frequency calibration clock of said second high speed digital circuit.

32. The method as set forth in claim 30, wherein,
said first reconstructed digital clock and said complement of said first reconstructed digital clock are generated in said step a) using a flip flop for receiving said entering digital clock, said constant high enable and said first clear signal as inputs, and generating said first reconstructed digital clock and said complement of said first reconstructed digital clock by clocking said constant high enable into said flip flop at the rising clock edge of each clock period of said entering digital clock, concurrently clocking said constant high enable and a complement of said constant high enable out of said flip flop, and then clearing said flip flop and said flip flop's outputs upon receipt of said first clear signal;
said calibration process is performed with a preset presetting said flip flop in lieu of receiving said entering digital clock from said first high speed digital circuit.

33. The method as set forth in claim 20, wherein the value of said delay setting selection signal provided is determined through a calibration process by repeatedly comparing frequencies of said first reconstructed digital clock under various trial values of said delay setting selection signal to frequency of said entering digital clock, starting with an initial trial value and varying the trial value systematically in a predetermined manner, said entering digital clock being a maximum operating frequency calibration clock of said second high speed digital circuit.

34. The method as set forth in claim 33, wherein, said initial trial value is a very large trial value, and the trial value is decremented systematically towards smaller trial values.

35. The method as set forth in claim 20, wherein,
said step a) further comprises receiving a second clear signal, and generating a second reconstructed digital clock using said entering digital clock, said constant high enable, and said second clear signal, said second reconstructed digital clock being used as a basis for providing early warning against said first reconstructed digital clock drifting away from said entering digital clock; and
said step c) further comprises generating said second clear signal using said first clear control signal.

36. The method as set forth in claim 35, wherein, said first and second reconstructed clock are reconstructed using a first and a second flip flop coupled to said first high speed digital circuit for receiving said entering digital clock, said constant high enable and said first and second clear signals as inputs, and generating said first and second reconstructed digital clocks and said complement of said first reconstructed digital clock by clocking said constant high enable into said first and second flip flops at the rising clock edge of each clock period of said entering digital clock, concurrently clocking said constant high enable out of said first and second flip flops and a complement of said constant high enable out of said first flip flop, and then clearing said first and second flip flops and said first and second flip flops' outputs upon receipt of said first and second clear signals.

37. The method as set forth in claim 35, wherein, said step c) comprises the steps of:
c.1) performing a logical OR operation using a preselected one of said delayed first reconstructed digital clocks and a calibration/operation control signal, and outputting the logical OR result;
c.2) performing a first logical NAND operation using said first clear control signal and said logical OR result, and outputting the logical NAND result as said first clear signal; and
c.3) performing a second NAND operation using said first clear control signal and a logical one, and outputting the logical NAND result as said second clear signal.

38. The method as set forth in claim 35, wherein, said step c) comprises the steps of:
c.1) performing a first logical NAND operation using said first clear control signal and a first logical one, and outputting the logical NAND result as said first clear signal; and
c.2) performing a second NAND operation using said first clear control signal and a second logical one, and outputting the logical NAND result as said second clear signal.

39. In a digital system comprising a digital clock, a first and a second high speed digital circuit coupled to each other, an apparatus for digitally compensating clock skew in said digital clock as said digital clock enters said second high speed digital circuit after having traveled through said first high speed digital circuit, said apparatus comprising:
a) a first flip flop coupled to said first high speed digital circuit for receiving said entering digital clock, a constant high enable, and a first clear signal as inputs, and generating a first reconstructed digital clock and a complement of said first reconstructed digital clock using said received entering digital clock, constant high enable and first clear signal;
b) a programmable delay chain comprising a plurality of delay elements coupled to said first flip flop, and a plurality of multiplexors coupled to said delay elements for receiving said generated first reconstructed digital clock, said complement of said generated first reconstructed digital clock, and a delay setting selection signal, applying various delays to said received first reconstructed digital clock and said complement of said generated first reconstructed digital clock, and dynamically selecting one of said delayed first reconstructed digital clocks based on said delay setting selection signal for output as a first clear control signal;

c) a first gate assembly comprising a first OR gate coupled to said programmable delay chain, and a first NAND gate coupled to said first OR gate and said first flip flop for receiving said generated first clear control signal, and generating said first clear signal for said first flip flop using said received first clear control signal.

40. The apparatus as set forth in claim 39, wherein, said programmable delay chain further generates a second clear control signal, said second clear control signal being a preselected one of said delayed first reconstructed digital clocks and said delayed complement of said first reconstructed digital clocks;

said programmable delay chain further comprises b.3) a second OR gate and a plurality of AND gates coupled to said delay elements and said multiplexors for receiving said preselected delayed clock and a calibration/operation control signal, and modifying said dynamically selected delayed clock before outputting said modified dynamically selected delayed clock as said first clear control signal, said calibration/operation control signal indicating whether said apparatus is operating in a calibration or an operation mode.

41. The apparatus as set forth in claim 40, wherein, said first gate assembly further comprises:

c.1) a third OR gate coupled to said delay elements of said programmable delay chain for receiving said preselected delayed clock and said calibration/operation control signal as inputs, and outputting the logical OR result of said third OR gate's received inputs; and c.2) a second NAND gate coupled to said programmable delay chain for receiving said first clear control signal and said logical OR result, and outputting the logical NAND result of said second NAND gate's received inputs as said first clear signal.

42. The apparatus as set forth in claim 39, wherein, said first gate assembly further comprises a second NAND gate coupled to said programmable delay chain for receiving said first clear control signal and a logical one as inputs, and outputting the logical NAND result of said second NAND gate's received inputs as said first clear signal.

43. The apparatus as set forth in claim 39, wherein, said apparatus further comprises d) at least one measurement circuit coupled to said first flip flop for measuring frequency of said first reconstructed digital clock.

44. The apparatus as set forth in claim 43, wherein, said at least one measurement circuit further measures clock period high and low time of said first reconstructed digital clock.

45. The apparatus as set forth in claim 39, wherein, said apparatus further comprises d) at least one comparison circuit coupled to said first flip flop and said first high speed digital circuit for receiving said entering digital clock and said first reconstructed digital clock and comparing frequencies of said entering digital clock and said first reconstructed digital clock.

46. The apparatus as set forth in claim 39, wherein, said apparatus further comprises d) ring oscillators comprising a plurality of rings of known length having delay elements identical to said delay elements of said programmable delay chain for generating a number of ring signals.

47. The apparatus as set forth in claim 39, wherein the value of said delay setting selection signal provided to said programmable delay chain is determined through a calibration process by repeatedly measuring frequencies of said first reconstructed digital clock under various trial values of said delay setting selection signal, starting with an initial trial value and varying the trial value systematically in a predetermined manner.

48. The apparatus as set forth in claim 47, wherein said digital clock traveling through said first high speed digital circuit and entering said second high speed digital circuit is a maximum operating frequency calibration clock of said second high speed digital circuit.

49. The apparatus as set forth in claim 47, wherein, said calibration process is performed with a preset presetting said first flip flop in lieu of receiving said entering digital clock from said first high speed digital circuit.

50. The apparatus as set forth in claim 39, wherein the value of said delay setting selection signal provided to said programmable delay chain is determined through a calibration process by repeatedly comparing frequencies of said first reconstructed digital clock under various trial values of said delay setting selection signal to frequency of said entering digital clock, starting with an initial trial value and varying the trial value systematically in a predetermined manner, said entering digital clock being a maximum operating frequency calibration clock of said second high speed digital circuit.

51. The apparatus as set forth in claim 39, wherein, said apparatus further comprises:

d) a second flip flop coupled to said first high speed digital circuit for receiving said entering digital clock, said constant high enable, and a second clear signal, and generating a second reconstructed digital clock using said entering digital clock, said constant high enable, and said second clear signal, said second reconstructed digital clock being used as a basis for providing early warning against said first reconstructed digital clock drifting away from said entering digital clock; and e) a second gate assembly comprising a second NAND gate coupled to said programmable delay chain and said second flip flop for receiving said first clear control signal and generating said second clear signal using said first clear control signal.

52. The apparatus as set forth in claim 39, wherein, said digital system is a data instrumentation system; said first high speed digital circuit is a high speed probe; and said second high speed digital circuit is a trace and recognition circuit of a trace board.

53. A data instrumentation system comprising:

a) a high speed probe;

b) a trace board comprising a high speed trace and recognition circuit coupled to said high speed probe for receiving a digital clock from said high speed probe, said digital clock incurring clock skew as said digital clock travels from said high speed probe to said high speed trace and recognition circuit, said high speed trace and recognition circuit comprising:

b.1) a first flip flop coupled to said high speed probe for receiving said entering digital clock, a constant high enable, and a first clear signal as inputs, and generating a first reconstructed digital clock and a complement of said first reconstructed digital clock using said received entering digital clock, constant high enable and first clear signal;

b.2) a programmable delay chain comprising a plurality of delay elements coupled to said first flip flop, and a plurality of multiplexors coupled to said delay elements for receiving said generated first reconstructed digital clock, its complement, and a delay setting selection signal, applying various delays to said received first reconstructed digital clock and its complement, and dynamically selecting one of said delayed clocks based on said delay setting selection signal for output as a first clear control signal;

b.3) a first gate assembly comprising a first OR gate coupled to said programmable delay chain, and a first NAND gate coupled to said first OR gate and said first flip flop for receiving said generated first clear control signal, and generating said first clear signal for said flip flop using said received first clear control signal.

54. The data instrumentation system as set forth in claim 53, wherein, said high speed trace and recognition circuit further comprises:

b.4) a second flip flop coupled to said high speed probe for receiving said entering digital clock, said constant high enable, and a second clear signal, and generating a second reconstructed digital clock using said entering digital clock, said constant high enable, and said second clear signal, said second reconstructed digital clock being used as a basis for providing early warning against said first reconstructed digital clock drifting away from said entering digital clock; and b.5) a second gate assembly comprising a second NAND gate coupled to said programmable delay chain and said second flip flop for receiving said first clear control signal and generating said second clear signal using said first clear control signal.

* * * * *